United States Patent [19]
Sato

[11] Patent Number: 4,987,656
[45] Date of Patent: Jan. 29, 1991

[54] PLAQUE HOLDING CLIP
[75] Inventor: Seiichi Sato, Kanagawa, Japan
[73] Assignee: Kato Hatsujo Kaisha, Ltd., Yokohama, Japan
[21] Appl. No.: 462,391
[22] Filed: Jan. 8, 1990
[30] Foreign Application Priority Data Sep. 25, 1989 [JP] Japan .................................. 1-248622

[51] Int. Cl.$^5$ ............................................. F16B 19/00
[52] U.S. Cl. ......................................... 24/297; 24/453; 411/508
[58] Field of Search ................. 24/297, 453, 587, 573; 411/508, 509, 510

[56] References Cited

U.S. PATENT DOCUMENTS

| | | | |
|---|---|---|---|
| 3,029,486 | 4/1962 | Raymond | 24/297 |
| 3,181,411 | 5/1965 | Mejlso | 24/453 |
| 3,249,973 | 5/1966 | Seckerson | 24/297 |
| 3,485,133 | 12/1969 | Rapata | 411/508 |
| 3,550,217 | 12/1970 | Collyer | 24/73 |
| 3,678,797 | 7/1972 | Seckerson | 85/5 R |
| 3,745,612 | 7/1973 | Seckerson | 24/73 PF |

FOREIGN PATENT DOCUMENTS

| | | | |
|---|---|---|---|
| 1464388 | 12/1966 | France | 24/297 |
| 849846 | 9/1960 | United Kingdom | 24/297 |
| 1065914 | 4/1967 | United Kingdom | 24/297 |
| 1163572 | 9/1969 | United Kingdom | 24/297 |
| 1444846 | 8/1976 | United Kingdom | 24/297 |

Primary Examiner—Victor N. Sakran
Attorney, Agent, or Firm—Foley & Lardner, Schwartz, Jeffery, Schwaab, Mack, Blumenthal & Evans

[57] ABSTRACT

According to the present invention, there is provided a plaque holding clip which is characterized by that it has a pair of elastic legs that constitute a trunk of the clip. Because the outer peripheries of the elastic legs are subjected to evenly applied external force and hence smooth changes of load when the clip is introduced into a fitting bore, it maintains its original plaque holding potential for a long time. Moreover, since the outer peripheries of the elastic legs are so designed that they suitably adapt themselves to the inner periphery of a fitting bore, they are free from any undesirable deformations and consequently any changes of the load applied thereto even if the clip is introduced into a fitting bore in an inclined condition. This feature contributes to the ease of handling the clip. A clip according to the invention may be provided with a central pillar to enhance its durability and the ease of handling without deteriorating the other features of the clip.

2 Claims, 4 Drawing Sheets

PLAQUE HOLDING CLIP

BACKGROUND OF THE INVENTION

1. Field of the Invention

This invention relates to a plaque holding clip to be used for rigidly fitting a plaque onto a panel by way of fitting bores arranged therein for decorating particularly the inside of an automobile with the plaque.

2. Prior Art

A have been number of plaque holding clips proposed each designed for fitting a plaque onto a panel by way of fitting bores arranged therein for decorating the inside of an automobile FIGS. 10 through 12 show some plaque holding clips of this category.

FIGS. 10(a) and 10(b) are views of a plaque holding clip disclosed in U.S. Pat. No. 3,550,217. This clip is an integral unit made of synthetic resin comprising a head 1 and a trunk 2 provided with a pair of elastic leg members 3, 3, said trunk 2 being so designed as to be introduced into a fitting bore of a panel and having a horizontal sectional view of similar to the letter W. As illustrated in FIG. 10(b), each of said elastic legs 3, 3 is extended upward from the pointed tip of said trunk 2, it having a free end arranged apart from the head 1.

Since the elastic legs 3, 3 of this unit are connected with the trunk at the point tip portion 4 thereof in such a way that the trunk 2 form a horizontal sectional view of letter W. The rigidity of the trunk 2 is enhanced to such an extent that, when the elastic legs 3, 3 are introduced into a fitting bore of a panel, the outer edges of the standing elastic legs 3, 3 are apt to be abraded by the peripheral wall of the fitting bore, to reduce its outer dimensions and consequently its load holding potential as the unit is repeatedly used.

In FIGS. 11(a) and 11(b), a clip according to U.S. Pat. No. 3,678,797 comprising, similar to the one as described above, a head 1 and a trunk 2 provided with a pair of legs 3, 3 is illustrated. However, unlike the clip of FIG. 10, the trunk 2 of this unit displays a horizontal sectional view of an anchor as shown in FIG. 11(b). It is introduced into a fitting bore of a panel with the outermost sides of the legs tightly pressed against the peripheral wall of the fitting bore. With such a configuration, the elasticity of the legs is excessively high and, consequently, as in the case of the clip of FIG. 10, the outermost sides of the legs 3, 3 are subjected to a high resistance of the peripheral wall of the fitting bore and, hence, abraded by the latter to reduce the holding potential of the unit in the course of repeated use.

FIGS. 12(a) and 12(b) shows a clip disclosed in U.S. Pat. No. 3,745,612 comprising, like the preceding examples, a head 1 and a trunk 2 provided with a pair of legs 3, 3, said trunk 2 having a horizontal sectional view of letter S as illustrated in FIG. 12(b). With this clip, the legs 3, 3 are connected with the trunk 2 at the pointed tip portion 4 thereof, and the outer edges of the legs 3, 3 are deflected inside as they are forcibly introduced into a fitting bore of a panel and abraded by the peripheral wall of the fitting bore as the unit is repeatedly used.

Moreover, since a clip having a horizontal sectional view of letter S inevitably requires considerable thickness, its flexibility cannot be high and, therefore the outer edges of the legs can be abraded and worn at a relatively high rate.

Thus, while each of the clips described above has a pair of legs 3, 3 standing from and connected with the trunk 2 at the pointed tip portion 4 thereof and the free top ends of the legs 3, 3 are so arranged as to be separated from the head 1 in order to enhance the elasticity and reduce the rigidity of the unit, none of them are protected against abrasion of the legs 3, 3 by the peripheral wall of the fitting bore of a plaque into which it is introduced. Hence they are not free from the problem of reduction with time of holding potential.

It is therefore an object of the present invention to provide a plaque holding clip, wherein, while it has a pair of elastic legs standing upward from the pointed tip portion of the trunk as in the case of conventional clips, the tops of the legs are not separated from, but connected with, the head in order to enhance the rigidity of the unit. At the same time, the horizontal sectional view of the combined trunk and legs is not like letter W, nor an anchor, nor letter S, but presents a pair of separately sectioned and arc-shaped areas for the elastic legs, which are so designed that their outer peripheries are evenly pressed against the peripheral wall of the fitting bore of a panel that receives them and that consequently and unlike those of conventional clips, they are free from abrasion caused by the peripheral wall of the fitting bore and reduction of holding potential relative to the bore through repeated use. Such a clip will also afford an easy handling because it can accommodate improper operational actions such as pushing the clip in an averted direction and abruptly changing the amount of the force applied to the clip and because it can be removed smoothly from the fitting bore by external force without damaging the plaque holding potential of the elastic legs.

Another object of the present invention is to provide a plaque holding clip which, in addition to the components as described above, further comprises a central pillar arranged in an axial space provided between the pair of legs and connected at its one end with the head and at its other end with the tip of the trunk where the elastic legs are also connected with the trunk in order to reinforce the strength of the trunk and eliminate any possible reduction of the holding potential as well as buckling and deformation of the elastic legs in the course of repeated use of the clip.

SUMMARY OF THE INVENTION

According to the invention, the above and other objects of the invention are achieved by providing a plaque holding clip comprising a head for clamping and holding a plaque, a trunk for introducing the clip into a fitting bore of a panel to anchor it, said trunk comprising a pair of elastic legs extended upward from its lower tip portion and symmetrically arranged relative to the axis of the head with a pair of spaces provided therebetween, each of said elastic legs having an outer periphery rounded semi-circularly and coaxially with the head and being convergently connected with the lower end of said trunk to form a pointed tip of the trunk for ease of introducing the clip into a fitting bore, said outer periphery of said pair of elastic legs being tapered and so formed that they are subjected to a force evenly applied thereto by the peripheral wall of the fitting bore when said clip is introduced therein.

A preferred embodiment of the invention comprises a head for clamping and holding a plaque, a trunk for introducing the clip into a fitting bore of a panel to anchor it, said trunk comprising a pair of elastic legs extended upward from its lower tip portion and symmetrically arranged relative to the axis of the head with a pair of spaces provided therebetween, each of said elastic legs having an outer periphery rounded semi-circularly and coaxially with the head and being convergently connected with the lower end of said trunk to form a pointed tip of the trunk for ease of introducing the clip into a fitting bore, said clip further comprising a central pillar arranged in an axial space provided between the pair of legs and connected at its one end with the head and at its other end with the tip of the trunk, said outer periphery of said pair of elastic legs being tapered and so formed that they are subjected to a force evenly applied thereto by the peripheral wall of the fitting bore when said clip is introduced therein.

When a clip according to the invention is introduced into a fitting bore of a panel from the tip portion of the trunk and the head of the clip is pressed toward the tip portion, the pair of outer peripheries of the elastic legs are evenly pressed against the peripheral wall of the fitting bore and suitably deformed to be held by the wall as the clip proceeds in the fitting bore.

Since the elastic legs are subjected to a force which is evenly distributed on their outer peripheries during the whole process of passing through the fitting bore, the peripheries are free from any risk of being abraded by the wall even when the clip is removed out of the fitting bore. Moreover, since each of the outer peripheries of the elastic legs is rounded in the form of a semi-circle and hence it evenly abuts the peripheral wall of the fitting bore, the clip exerts satisfactory force for holding a plaque.

The above described preferred embodiment of the invention has features which are essentially same as those described just above, although such an embodiment is additionally protected against unintentional deformations of the legs as it is reinforced by a central pillar. Hence it is durable and maintains its holding potential relative to the fitting bore of the panel for a long period of time without damaging the elastic legs.

Now the invention will be described in greater detail by referring to the accompanying drawings that illustrates preferred embodiments of the invention.

DETAILED DESCRIPTION OF THE INVENTION

Figure 1:
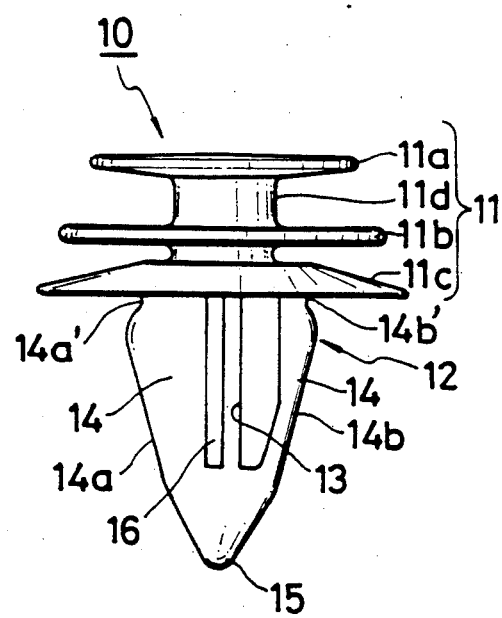
FIG. 1 is a front view of an embodiment of the invention.
Figure 2:
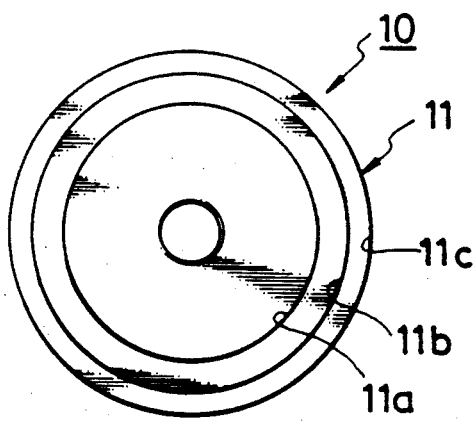
FIG. 2 is a plan view of the embodiment of FIG. 1 as it is seen from above.
Figure 3:
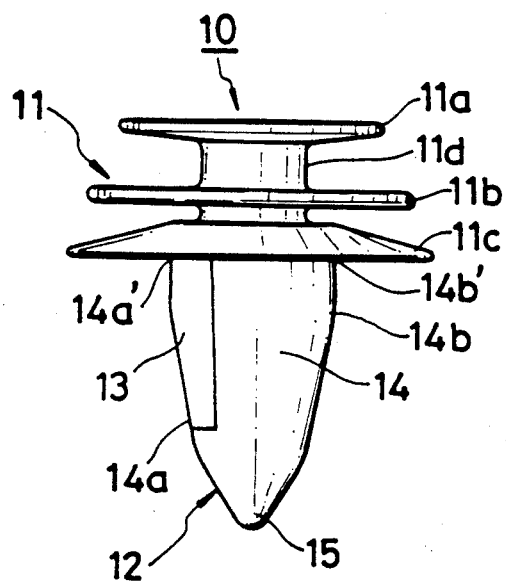
FIG. 3 is a side view of the embodiment of FIG. 1.
Figure 4:
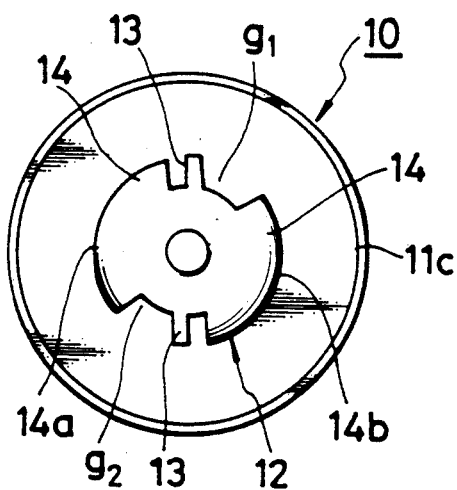
FIG. 4 is a plan view of the embodiment of FIG. 1 as it is seen from below.
Figure 5B:
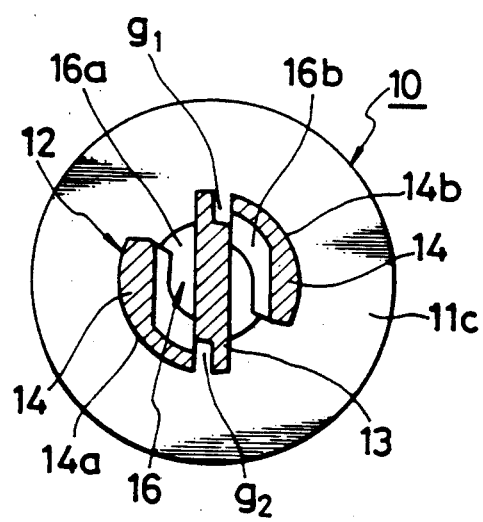
FIG. 5(b) is a vertical sectional view of the embodiment of FIG. 1 along the axis of the trunk.
Figure 5A:
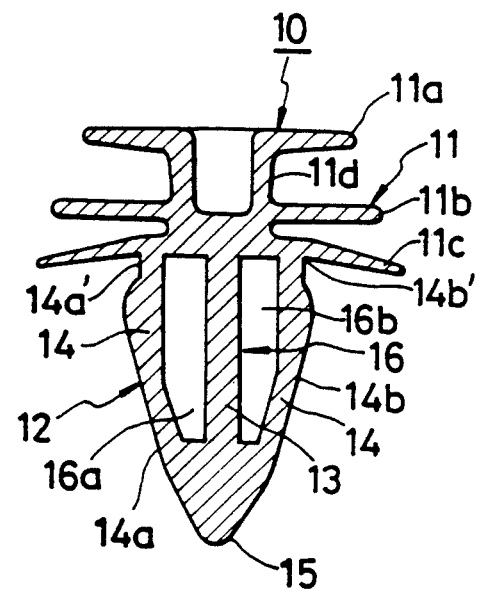
FIG. 5(a) is a horizontal sectional view of the trunk of the embodiment of FIG. 1.

The plaque holding clip 10 illustrated in FIGS. 1 through 5 comprises a head 11 for clamping and holding a plaque in a manner as shown in FIG. 2 and a trunk 12 for being introduced into a fitting bore of a panel and securely and engagedly held there, said trunk being provided with a central pillar 13 extended axially and downwardly from the center of the lower surface of the head 12 into an axial space 16 to divide said axial space 16 into two hollow areas 16a, 16a (FIGS. 5(a) and (b) and a pair of elastic legs 14, 14 extended downwardly from the lower surface of the head 11 to surround the axial space 16.

As shown in FIG. 5, the horizontal sectional view of the outer peripheries of said pair of elastic legs 14, 14 present several coaxial semi-circles, and gaps g1, g2 are provided between said two elastic legs 14, 14. Said central pillar 13 and said pair of elastic legs 14, 14 are connected together at their lower ends to form a pointed tip 15 of the trunk 12.

Moreover, the outer peripheries 14a, 14b of the elastic legs 14, 14 are tapered toward end 15 in such a manner that, when the clip is introduced into the fitting bore, the outer peripheries of the elastic legs are evenly and uniformly subjected to the pressure applied to them by the peripheral wall of the fitting bore. In the illustrated embodiment, a pair of recessed areas 14a', 14b' are respectively formed adjacent to the head 11 on the top portions of the outer peripheries 14a, 14b of the pair of elastic legs 14, 14 for ultimately receiving the panel.

As apparent from FIGS. 1, 2 and 3, the head 11 comprises an upper flange 11a, a middle flange 11b and a main flange 11c extended radially perpendicularly to the axis of the clip from the neck section 11d of the head 11 in the form of so many discs, said upper and middle flanges 11a and 11b being parallel to each other with the middle flange 11b having a diameter larger than that of the upper flange 11a, said main flange 11c being in the form of an inverted flexible saucer having a thickness decreasing toward the outer periphery that the lower surface of said main flange 11c can be airtightly pressed against the upper surface of the panel.

As will be described later in greater detail, a plaque will be clamped by said upper flange 11a and said middle flange 11b and securely held there.

While the above embodiment is provided with three flanges, the middle flange 11b or both the upper and middle flanges 11a and 11b may be omitted to leave respectively the upper flange 11a and the main flange 11c or only the main flange 11c for securely holding both a panel and a plaque depending on the conditions under which the clip is used. In short, the number of flanges to be provided on a clip according to the invention may be varied depending on the conditions of actual use and, therefore, it is not necessary to define the number of flanges.

Referring to FIGS. 5(a) and 5(b) illustrating an axial sectional view and a horizontal sectional view across the trunk 2, as well as FIG. 4 showing a plan view of the clip as seen from below, it should be noted that a pair of elastic legs 14, 14 are extended from the lower surface of a head 11 in such a manner that they are separated from each other by an axial space 16, that they respectively have semi-circular outer peripheries 14a, 14b as seen from below which are tapered toward the lower end thereof, and that head 11 and a pointed tip 15 of the clip 10 are connected with each other by way of a central pillar 13 and said pair of elastic legs 14, 14. In other words, central pillar 13 and the pair of elastic legs 14, 14 are separated from each other. The elastic legs 14, 14 have semi-circular outer peripheries, as seen from below, in order to minimize the resistance of the peripheral wall of a bore when the clip is introduced into the bore and inner walls approximately parallel to the central pillar 13 in order to facilitate the molding of the clip.

Figure 6B:
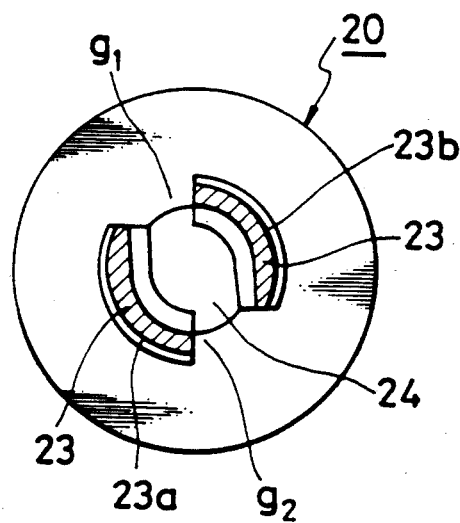
FIG. 6(b) is a horizontal sectional view of the trunk of the embodiment of FIG. 6(a)
Figure 6A:
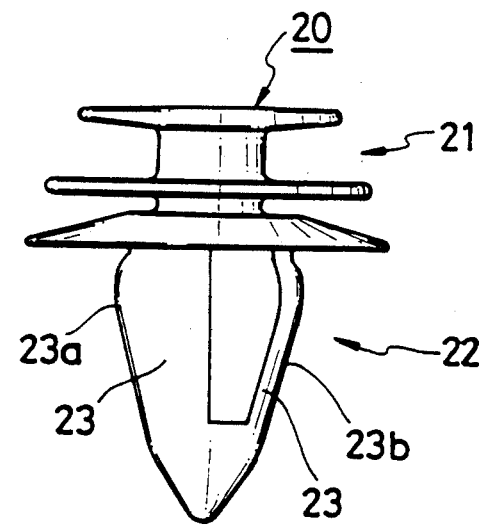
FIG. 6(a) is a front view of another embodiment of the invention.
Figure 10B:
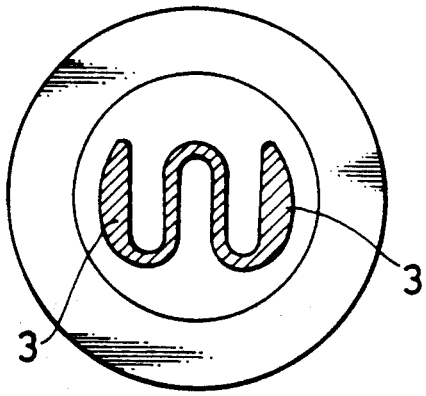
Figure 10A:
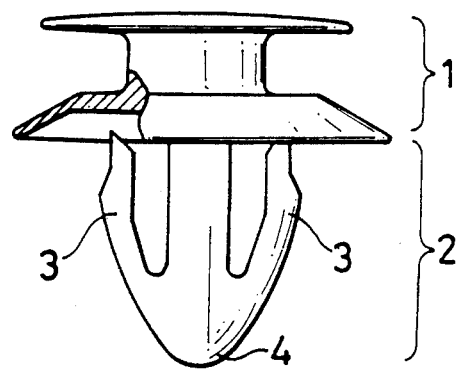
Figure 11B:
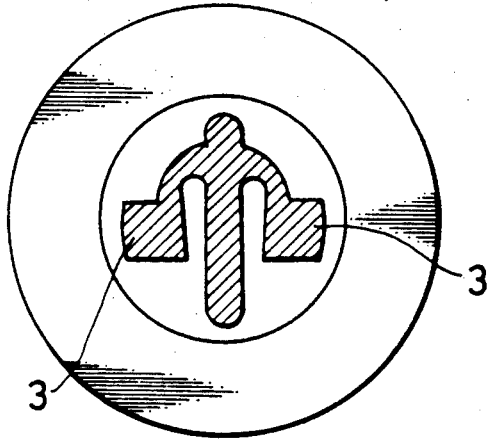
Figure 11A:
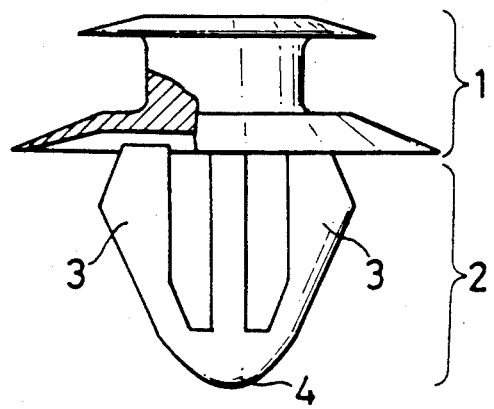
Figure 12B:
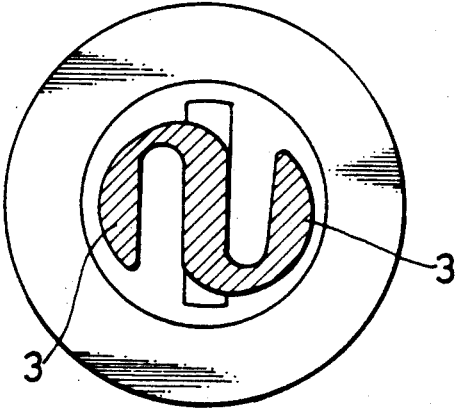
Figure 12A:
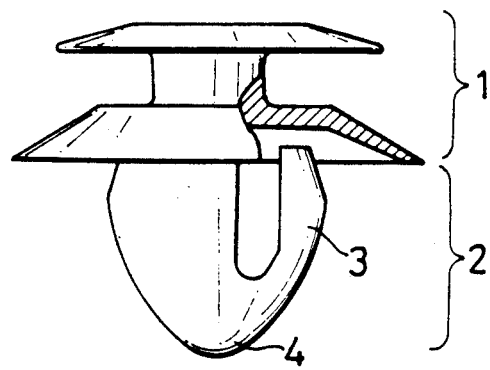

Now another embodiment of the invention will be described by referring to FIGS. 6(a) and 6(b) illustrating a front view and a horizontal sectional view of the embodiment respectively.

A plaque holding clip 20 also comprises a head 21 for clamping and holding a plaque, and a trunk 22 for being introduced into a fitting bore of a panel and securely and engagedly held there. The trunk 22 is provided with a pair of elastic legs 23, 23 extended downwardly from the lower surface of the head 21 to surround the axial space 24. As shown in FIG. 6(b), the horizontal sectional view of the outer peripheries of said pair of elastic legs 24, 24 present several coaxial semi-circles. The pair of elastic legs 23, 23 are connected together at their lower ends to form a pointed tip 25 of the trunk 22. Moreover, the outer peripheries 23a, 23b of the elastic legs 23, 23 are tapered toward downward in such a manner that, when the clip is introduced into the fitting bore, the outer peripheries of the elastic legs are evenly and uniformly subjected to the pressure applied to them by the peripheral wall of the fitting bore.

In short, the second embodiment as described above is essentially similar to the first embodiment and differs from the latter in that, while the latter have a central pillar 13, the former does not.

Figure 7:
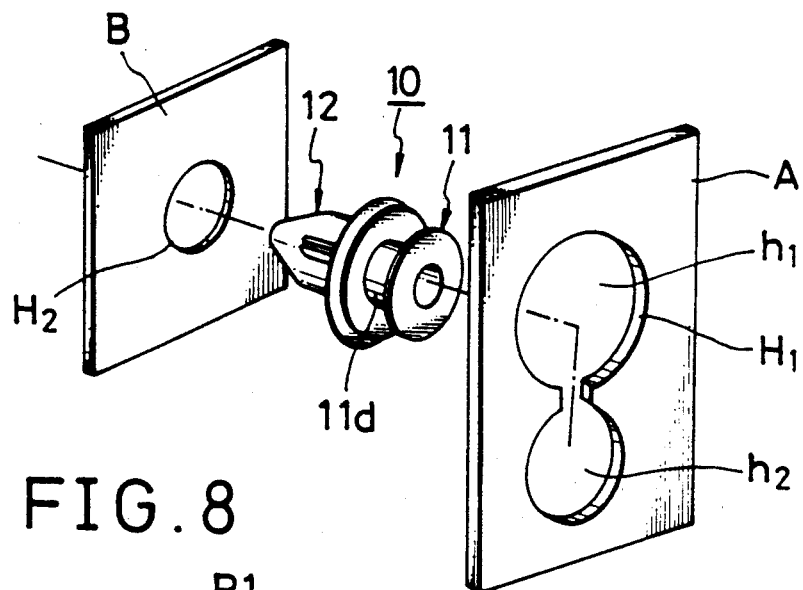
FIG. 7 is a perspective view of the embodiment of FIG. 1 illustrating how it is used for holding a plaque to a panel.
Figure 8:
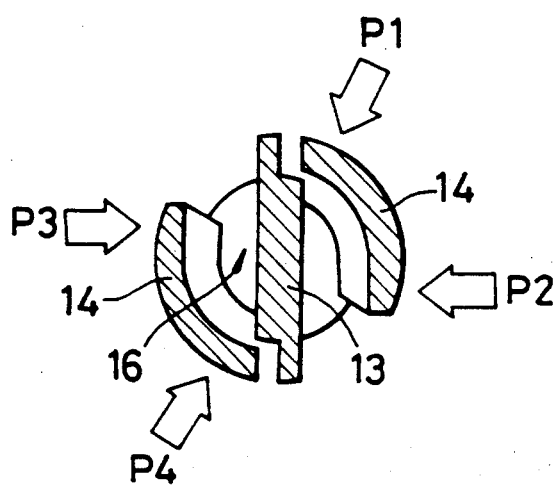
FIG. 8 is a schematic illustration showing how the trunk of the embodiment of FIG. 1 is subjected to compressive force it is introduced into a fitting bore.

Now how a plaque holding clip 10 as described above is used to securely fit a plaque A onto a panel B of an automobile will be described by referring to FIG. 7.

Firstly, a plaque is set between the upper flange 11a and the middle flange 11b of the plaque holding clip 10 by moving the head of the clip 10 through the larger bore h1 of paired bores H1 and then shifting its position into the smaller bore h2 so that the neck 11d is tightly surrounded by the smaller one h2.

The plaque A is provided with a number of paired bores H1, H1, . . . which are arranged in rows with a given distance between any two adjacent paired bores and, when each and every one of them are fitted with a clip, the trunks 12, 12, . . . of the plaque holding clips 10, 10, . . . are forcibly driven into the corresponding bores H2, H2, . . . of the panel B with their respective pairs of elastic legs 14, 14, 14, 14, . . . . . . . frictionally moving on the respective peripheral walls of the fitting bores H2, H2, . . . .

Each of the plaque holding clips 10, 10, . . . are moved in the fitting hole with the outer peripheries of the elastic legs 14, 14 evenly pressed inwardly by external forces P1, P2, P3 and P4 until the panel is received by the recesses 14a', 14b'.

The smooth movement of the clip is ensured by its own ingeniously designed configuration where a pair of elastic legs 14, 14 are extended directly from a head 11 and taper downward until they are connected with each other at a pointed tip 15 in such a manner that, when the clip is introduced into the fitting bore, the outer peripheries of the elastic legs are evenly and uniformly subjected to the pressure applied to them by the peripheral wall H2 of the fitting bore.

Figure 9:
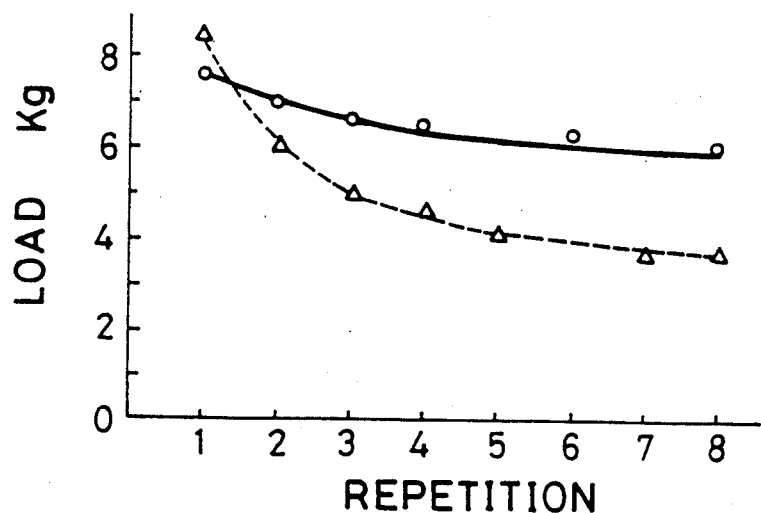
FIG. 9 is a graphic illustration showing, for comparison, changes of the holding potential of the embodiment of FIG. 1 relative to a fitting bore as it is repeatedly introduced into and removed from the fitting bore and those of a conventional clip, and FIGS. 10(a) and (b) through FIGS. 12(a) and (b) show in combination vertical and horizontal sectional views of three different conventional clips.

FIG. 9 is a graphic illustration showing for comparison changes of the holding potential of the embodiment of FIG. 1 relative to a fitting bore as it is repeatedly introduced into and removed from the fitting bore and those of a conventional clip observed in an experiment, where solid line a represents the embodiment of this invention and dashed line b represents a conventional clip. While the conventional clip reveals a dramatic drop of its holding potential after it had been introduced and removed once and twice as shown by line b, the embodiment proved to be very durable in terms of its holding potential.

The embodiment of FIG. 5 can be used in a similar manner and, since the provision of the central pillar 13 of this embodiment can improve the strength of the trunk 12, it will prove to be durable as much as or more than the first embodiment against buckling or other damage.

As is apparent from the above description, a plaque holding clip according to the invention is characterized by the fact that it has a pair of elastic legs that constitute a trunk of the clip. Because the outer peripheries of the elastic legs are subjected to evenly applied external force and hence smooth changes of load when the clip is introduced into a fitting bore, it maintains its original plaque holding potential for a period of long time.

Moreover, since the outer peripheries of the elastic legs are so designed that they suitably adapt themselves to the inner periphery of a fitting bore, they are free from any undesirable deformations and consequently any changes of the load applied thereto even if the clip is introduced into a fitting bore in an inclined condition. This feature contributes to the ease of handling the clip.

A clip according to the invention may be provided with a central pillar to enhance its durability and the ease of handling without deteriorating the other features of the clip.

What is claimed is:

1. A plaque holding clip, comprising:
a head for clamping and holding a plaque,
a trunk for introducing the clip into a fitting bore of a panel to anchor it therein, said trunk comprising a pair of elastic legs extending upward from its lower tip portion and symmetrically arranged relative to the axis of the head with a pair of spaces provided therebetween, each of said elastic legs having an outer periphery rounded semi-circularly coaxially with the head and being convergently connected to the lower end of said trunk to form a pointed tip on the trunk for ease of introducing the clip into a fitting bore, said outer periphery of said pair of elastic legs being tapered and so formed that they are subjected to the force evenly applied thereto by the peripheral wall of the fitting bore when said clip is introduced therein.

2. A plaque holding clip comprising a head for clamping and holding a plaque, a trunk for introducing the clip into a fitting bore of a panel to anchor it, said trunk comprising a pair of elastic legs extending upward from its lower tip portion and symmetrically arranged relative to the axis of the head with a pair of spaces provided therebetween, each of said elastic legs having an outer periphery rounded semi-circularly and coaxially with the head and being convergently connected with the lower end of said trunk to form a pointed tip of the trunk for ease of introducing the clip into a fitting bore, said clip further comprising a central pillar arranged in an axial space provided between the pair of legs and connected at its one end with the head and at its other end with the tip of the trunk, said outer periphery of said pair of elastic legs being tapered and so formed that they are subjected to a force evenly applied thereto by the peripheral wall of the fitting bore when said clip is introduced therein.

* * * * *